April 2, 1963     M. KANES     3,083,576
PRESSURE-RESPONSIVE DEVICE

Filed Oct. 9, 1959     2 Sheets-Sheet 1

INVENTOR
MURRAY KANES
BY *K. G. Doub*
ATTORNEY

April 2, 1963 M. KANES 3,083,576
PRESSURE-RESPONSIVE DEVICE
Filed Oct. 9, 1959 2 Sheets-Sheet 2

INVENTOR
MURRAY KANES
BY K.G.Doub
ATTORNEY

United States Patent Office

3,083,576
Patented Apr. 2, 1963

3,083,576
PRESSURE-RESPONSIVE DEVICE
Murray Kanes, Towson, Md., assignor to The Bendix Corporation, a corporation of Delaware
Filed Oct. 9, 1959, Ser. No. 845,418
7 Claims. (Cl. 73—409)

The present invention relates to a pressure responsive device. More particularly, it relates to a device combining an expansible chamber in the form of an inflatable tube with means for detecting volume changes in the tube resulting from variations in pressure of an applied fluid. The pressure of the fluid may thereby be measured and locally indicated or remotely communicated.

The essential elements of the present invention consist of a flexible tube, which is in communication with the fluid being sensed, and operatively associated therewith is a particular type of motion-translating mechanism which can be readily adapted to drive an indicator or recorder, or any desired electric or mechanical controlling element.

An object of the present invention is to provide a pressure-sensing device and associated actuating mechanism capable of functioning as a visual indicator, or by slight modification, as an electrical or mechanical transducer without the need of complex mechanical or electrical amplifiers. Another object is to provide an indicator or controller which does not involve the use of auxiliary pressure seals or precision fits often-times required in piston type devices. A further object is to provide an indicator or controller capable of producing motions of relatively great magnitude, thus making possible a greater latitude of read-out indicia in the case of visual indicators and facilitating direct operation of electrical and mechanical transducers.

The foregoing and other objects and advantages will become apparent in view of the following description taken in conjunction with the drawings wherein.

Figure 1:
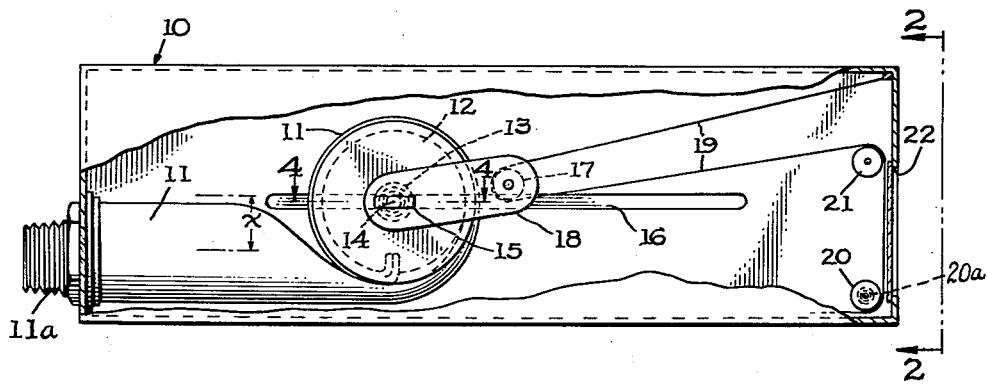
FIG. 1 is a view in side elevation of a pressure-sensing device and associated actuator in accordance with the invention, adapted for use as a visual indicator, the one side wall of the casing in which the mechanism is housed being broken away to expose essential operating parts.
Figure 3:
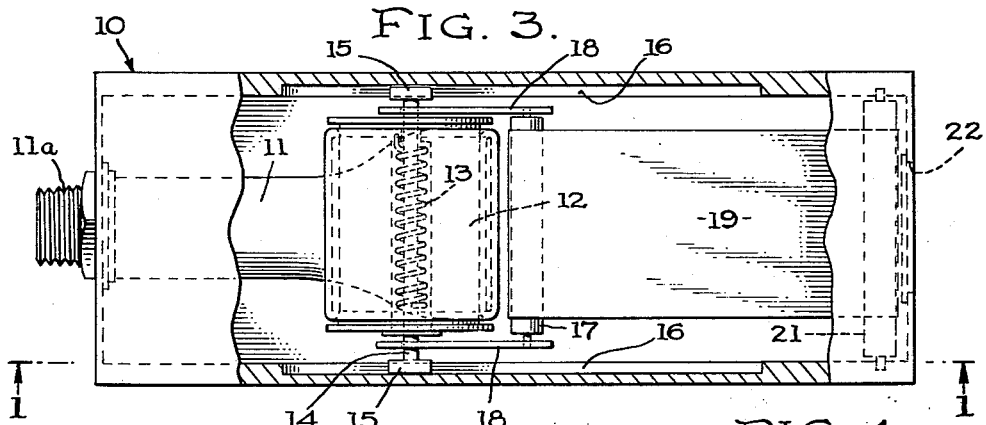
FIG. 3 is a top plan view of FIG. 1 with the top wall of the casing partly broken away.

Referring to the drawings in detail and first to FIGS. 1 to 4, inclusive, a case or housing is indicated at 10; it may be made of any suitable material adapted for the purpose. A collapsible tube 11 has its open end fixed to the one end wall of the housing 10 and is provided with a fitting 11a, to facilitate connection into a pipe line, container or other part of a system containing the fluid to be sensed. The tube 11 may be made of artificial or natural rubber, plastic or flexible metallic material, or a composition of materials having the requisite strength and flexibility. In some instances, it may be desirable to reinforce the tube walls with a metal laminate or wire mesh if the pressure range is sufficiently high to cause excessive elastic or plastic deformation of the tube. The other end of the tube is flattened and may be sealed; it is attached to a cylindrical spool or drum 12 about which the tube coils and uncoils as it becomes deflated and inflated in response to variations in the pressure being sensed. The drum 12 has an axial bore, to receive a torsional calibration spring 13, one end of which is fixed to the interior of the drum and the other end of which is attached to an axial trunnion or shaft 14. At its opposite ends the trunnion terminates in flattened heads 15, adapted to slide in trackways 16, formed in the side walls of the case 10. It will be obvious that as the pressure in the tube 11 increases and causes the tube to expand, the drum 12 will move to the right as viewed in FIG. 1 against the torsional resistance of the spring 13, and as the pressure decreases, the tube will collapse and the spring will drive the drum 12 to the left. The spring 13 should have a substantially constant spring force throughout the effective travel of the drum 12 and it should have sufficient strength to collapse the tube when its internal pressure reduces to a given value, depending upon the pressure range to be covered.

A roller 17 is provided with end trunnions which are journaled in the rear ends of links 18, said links projecting forwardly and having a rotatable bearing connection with the trunnion 14. This roller 17 may be considered a tape-actuating roller since it coacts with a tape take-up roller to drive tape 19.

Figures 2, 4:
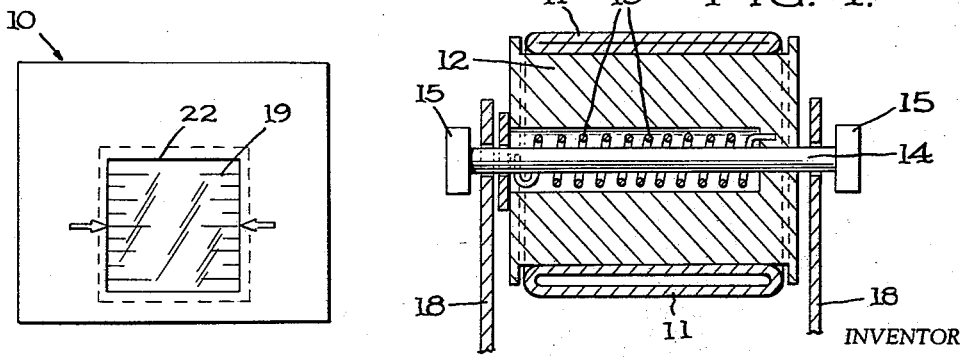
FIG. 2 is a view in end elevation of FIG. 1.
FIG. 4 is an axial section taken through the winding drum and associated parts.

In the form shown in FIGS. 1 and 2, the pressure-sensing device is adapted to function as a visual indicator. One method of adaptation is to provide tape 19 with suitable indicia and connect it at one end to a hollow take-up roller 20, journaled at its opposite ends in the case 10 and provided with an internal spring 20a tending to wind the tape on the roller with a substantially constant force. From the roller 20 the tape is passed upwardly over a guide roller 21, then over the actuator roller 17 and has its free end suitably attached or anchored to the case 10. As the tape is wound on and unwound from the roller 20, it moves past a window 22, formed in the rear end of the case 10. It will be seen that as the drum moves in a straight line back and forth in response to an increase or decrease in pressure in the tube 11, the roller 17 will likewise move in the tracks 16 and at the same time the tape 19 will wind and unwind on the roller 20.

*Operation When Used as a Pressure Indicator*

Should the pressure being sensed increase, tube 11 will uncoil in proportion to the magnitude of the increase, causing drum 12 to move to the right as viewed in FIG. 1, the spring constant of the spring 13 governing the resultant motion; and as this translational movement takes place, the tape 19 will wind on the roller 20 and the indicia on the tape will give a visual indication of the pressure existing in the system to which the device may be connected. Should the pressure in the system decrease, the spring 13 will move the drum to the left, causing the tube 11 to collapse as the drum rotates; and in this instance, the tape 19 will unwind from the roller 20 and the visual reading through the window 22 will show the decrease.

If the extended internal diameter of the tube 11 is defined as D, the force resulting from the internal pressure is the product of the internal pressure P and the internal area A. Thus—

$$\text{Force} = PA = P\frac{\pi D^2}{4}$$

This force will change as P changes, and will be proportional to the magnitude of P. The torque which results, causing the tube to become uncoiled from the drum 12, will be the product of the force F and the offset distance $x$, neglecting internal friction and other secondary effects. Thus—

$$\text{Torque } T = Fx = kP$$

where $k$ is a constant determined by the size of the tube and the offset.

$$k = \frac{\pi D^2 x}{4}$$

As the tube 11 uncoils from the drum 12, the effective distance x will vary somewhat. This variation may be minimized by making the diameter of the drum relatively large compared to the collapsed thickness of the tube, and thereby also reducing the total rotation of the drum.

If the torsional spring constant of 13 is defined as K, and the angular rotation of the drum 12 is $\theta$, the rotation resulting from an applied torque T will be—

$$\theta = \frac{T}{K}$$

or $$\theta = \frac{k}{K} \times P$$

Thus, the rotational displacement and consequently the translational motion of the drum 12 will be proportional to the applied pressure P.

Figure 5:
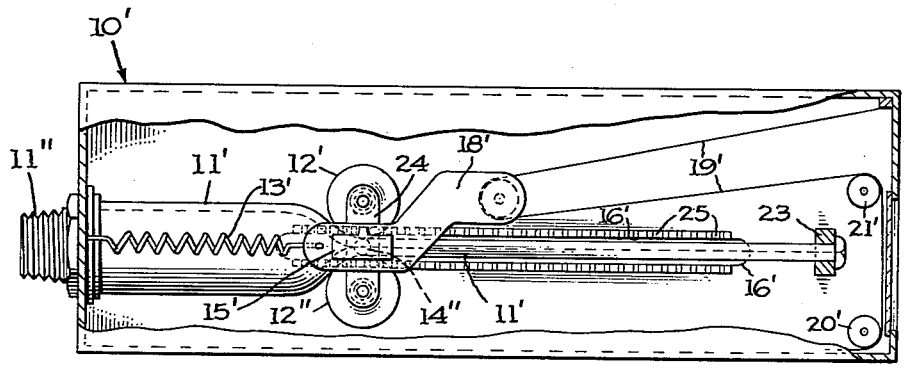
FIGS. 5 and 6 are views similar to FIGS. 1 and 2 of a modification.
Figure 6:
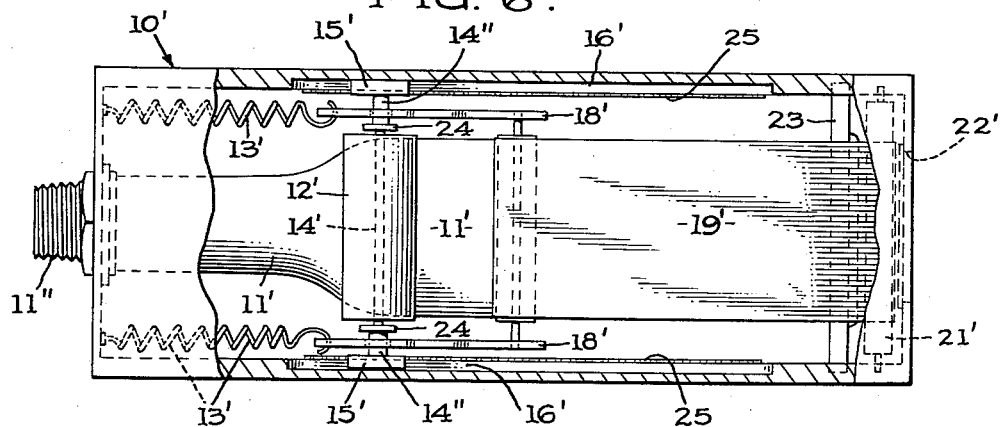

FIGS. 5 and 6

FIGS. 5 and 6 show the pressure-sensing device and associated actuator adapted for use as an electrical contactor to control an electric circuit; and there is also shown a modification in the roller arrangement. In these figures, parts which correspond to similar parts in FIGS. 1 to 4, inclusive, are given like reference numerals with exception that a prime (') has been added. In this instance the tube 11 does not wind and unwind on a roller; it has its closed end clamped between cross bars 23, anchored at opposite ends in the side walls of the case 10. There are two rollers, indicated at 12' and 12", and instead of having an internal torsion spring as in FIGS. 1 to 4, inclusive, there are two elongated coil springs 13', one end of each of which is secured to the front wall of the case 10 and the opposite end of which is secured to links 18'. Rollers 12' and 12" are provided with axial shafts 14', which are connected at their outer ends by links 24; and projecting from these links are trunnions 14" terminating in elongated heads 15', which ride in tracks 16'.

In this instance, the device is adapted to serve not only as an electrical contactor but also as a visual indicating device. Thus, connected to one of the sliding heads 15' is an electrical contactor, not visible in FIGS. 5 and 6 but which may be of conventional configuration, adapted to engage a series of contacts 25, which may be connected into an external electrical circuit, not shown, to be controlled.

The visual indicating means in FIGS. 5 and 6 is substantially similar to that of FIGS. 1 and 2.

Obviously many modifications and variations are possible in the light of the above teachings. It is a matter of ordinary skill to substitute a potentiometer for the contactor 25, for example, or to utilize the displacement of a roller for direct control purposes. Therefore, within the scope of the appended claims, the invention may be practiced otherwise than as specifically disclosed.

What I claim is:

1. A fluid-pressure indicator comprising an elongated hollow flexible-walled tube open at one end and closed at its opposite end, means facilitating communication of the open end of the tube with the fluid pressure being sensed, a housing, roller means mounted for substantially linear reciprocatory movement in said housing and clampingly engaging the tube body intermediate its open and closed ends, an axial trunnion carried by said roller means and projecting from opposite ends thereof, spring means urging said roller means in a direction tending to constrict the tube upon a decrease in the pressure being sensed, an increase in pressure causing the tube to expand and drive said roller means in the opposite direction against the torsional resistance of said spring, a tape-actuating roller mounted for substantially linear reciprocatory movement with said roller means, a flexible tape bearing indicia representing units of pressure passed over said tape-actuating roller and having its one end anchored to said case, and a spring-biased tape take-up roller on which the tape winds and unwinds as the tape-actuating roller reciprocates in response to changes in pressure of the fluid being sensed.

2. A pressure responsive device, comprising, an elongated hollow flexible walled tube open at one end and closed at its opposite end, means including a roller pressing on said tube and tending to maintain said tube in a collapsed deflated condition, means admitting pressure fluid to the open end of said tube, said pressure fluid tending to expand and inflate said tube and the walls of said tube presenting substantially greater resistance to increasing pressure in a radial direction than said first named means presents in an axial direction thereby causing displacement of said roller substantially proportional to the changes in pressure of said fluid, and means for sensing displacement of said roller whereby the pressure of said fluid will be determined.

3. A pressure responsive device comprising, an elongated inflatable tube having an open end and a closed end, means admitting pressure fluid to the open end of said tube, winding means tending to deflate and wind said tube spirally upon itself with the closed end thereof being innermost of the spiral, said winding means being resisted by the forces of said pressure fluid within said tube, means guiding said winding means for translational motion along a fixed path, and means for indicating the position of said winding means along said fixed path whereby the pressure of said pressure fluid will be indicated.

4. A pressure responsive device comprising, an elongated inflatable tube having an open end and a closed end, means admitting fluid under pressure to the open end of said tube, a cylinder attached to the closed end of said tube, means applying torque to said cylinder tending to wrap said tube about the circumference of said cylinder, said torque being counteracted by the pressure forces of the fluid within said tube, said cylinder undergoing translation from the closed end of said tube towards the open end thereof as said tube is wrapped about said cylinder, an axle upon which said cylinder rotates, guide means constraining translation of said axle to a fixed path and means for indicating the position of said axle along said guide means, said position being determined by a balance between the torque applied to said cylinder and the force of the pressure of said fluid, whereby the pressure of said fluid, whereby the pressure of the fluid will be indicated.

5. A pressure responsive device, comprising, a frame, an elongated inflatable tube having an open end and a closed end, said tube being suspended by said frame in an extended condition, a pair of rollers clampingly engaging said tube and arranged to travel along the length of said tube, means applying a variable force to said rollers to urge the same to travel towards the open end of said tube, said force being least at the open end of said tube and increasing as the distance of said rollers from said open end increases, means applying fluid under pressure to the open end of said tube, said fluid inflating said tube and displacing said rollers toward the closed end of said tube a distance proportional to the pressure of said fluid, and calibrated means for indicating the position of said rollers along said tube whereby the pressure of said fluid will be indicated.

6. A pressure responsive device comprising an inflatable flexible tube closed at one end and open at the other end, means for admitting pressure fluid to the open end of said tube, displaceable means tending to collapse said tube progressively from the closed end of said tube toward the open end of said tube including a cylindrical roller having the closed end of said tube attached to the periphery thereof and spring means applying torsion to said roller for coiling said tube about said roller, the pressure within said tube tending to resist progress of said roller, and means for sensing displacement of said roller whereby the pressure of the fluid contained by said tube will be indicated.

7. A pressure responsive device comprising an inflatable flexible tube closed at one end and open at the other end, means for admitting pressure fluid to the open end of said tube, displaceable means tending to collapse said tube progressively from the closed end of said tube toward the open end of said tube including a pair of cylindrical rollers disposed in clamping relationship to said tube and spring means urging said rollers to travel from the closed end of said tube towards the open end of said tube, the pressure within said tube tending to resist the progress of said rollers, and means for sensing displacement of said rollers whereby the pressure of the fluid contained by said tube will be indicated.

References Cited in the file of this patent

UNITED STATES PATENTS

| | | |
|---|---|---|
| 2,603,728 | Melchior | July 15, 1952 |
| 2,664,750 | McCrink | Jan. 5, 1954 |